(No Model.)
J. H. CASSIDY.
FRUIT JAR FASTENER.
No. 326,625. Patented Sept. 22, 1885.
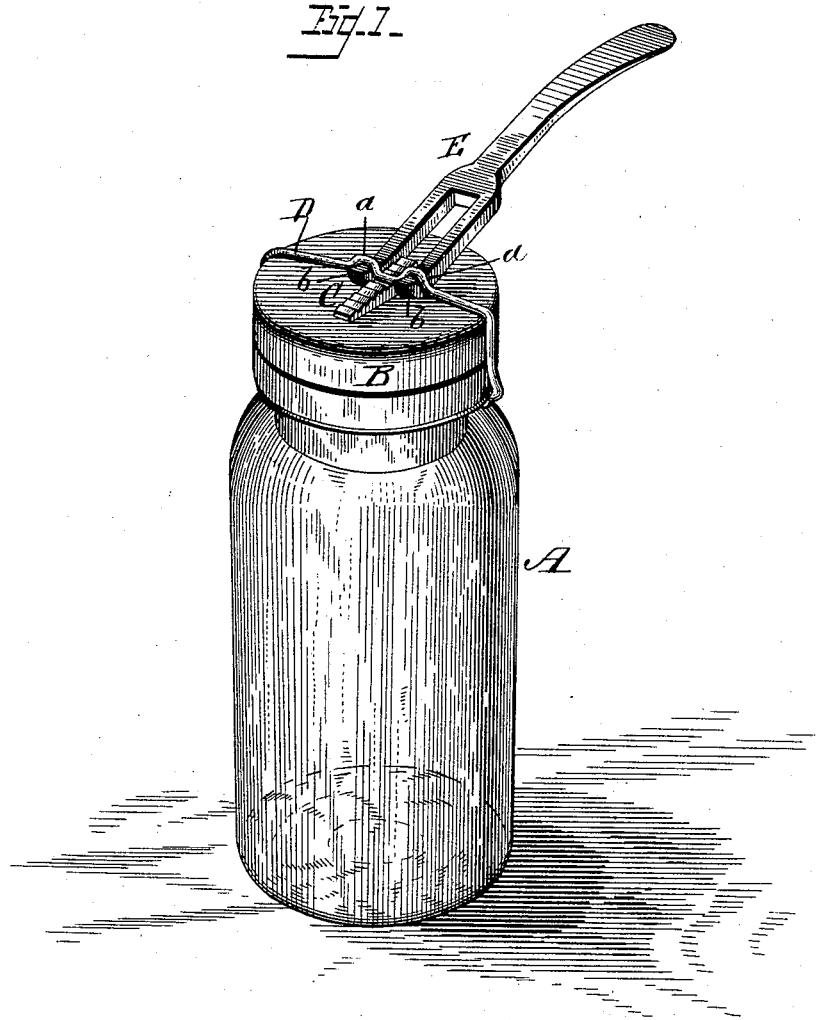
Witnesses
Inventor
Jacob H. Cassidy
By his Attorney Chas. H. Fowler
N. PETERS, Photo-Lithographer, Washington, D. C.

United States Patent Office.

JACOB H. CASSIDY, OF LEAVENWORTH, KANSAS, ASSIGNOR OF TWO-THIRDS TO CHAUNCEY L. KNAPP AND WILLIAM G. BOLMAN, OF SAME PLACE.

FRUIT-JAR FASTENER.

SPECIFICATION forming part of Letters Patent No. 326,625, dated September 22, 1885.

Application filed May 29, 1885. (No model.)

*To all whom it may concern:*

Be it known that I, JACOB H. CASSIDY, a citizen of the United States, residing at Leavenworth, in the county of Leavenworth and State of Kansas, have invented certain new and useful Improvements in Fruit-Jars; and I do hereby declare that the following is a full, clear, and exact description of the same, reference being had to the annexed drawings, making a part of this specification, and to the letters and figures of reference marked thereon.

Figure 1 of the drawings is a perspective view of a jar embodying my invention, and Fig. 2 a sectional view of the top thereof.

The present invention has relation to certain new and useful improvements in the means for securely fastening the covers upon fruit and other jars; and it consists in providing the cover with a serrated or toothed wedge and the neck of the jar with a bail to engage therewith, and bent to form loops to receive the ends of a lever, as will be hereinafter described and claimed.

In the accompanying drawings, A designates the jar, of any of the usual forms, and B the cover thereof.

Upon the upper side of the cover B is the serrated or toothed wedge C, with which engages the bail D, pivotally connected to the neck of the jar A in any well-known manner.

E is a rubber gasket resting on the top of the wall of the groove F in the neck of the jar.

The bail D is bent to form loops $a$ for convenience of inserting underneath the loops the curved ends $b$ upon the bifurcated ends or arms of a lever, E, and by pressing down on the handle of said lever the bail is brought forward or in a direction toward the highest part of the wedge, and by so doing the cover is pressed down tightly against and over the mouth of the jar, and the bail engaging with the serrations or teeth on the wedge will securely hold the cover in place, after which the lever may be withdrawn.

Having now fully described my invention, what I claim as new, and desire to secure by Letters Patent, is—

In a fastening for the covers of fruit and other jars a serrated or toothed wedge upon the cover, in combination with a bail pivoted to the neck of the jar and bent, as shown, to form loops upon each side of the wedge for convenience in inserting the bifurcated ends of a lever under them, substantially as and for the purpose specified.

In testimony that I claim the above I have hereunto subscribed my name in the presence of two witnesses.

JACOB H. CASSIDY.

Witnesses:
GEO. S. EMIG,
J. P. BAUSMANN.